Figure 9:
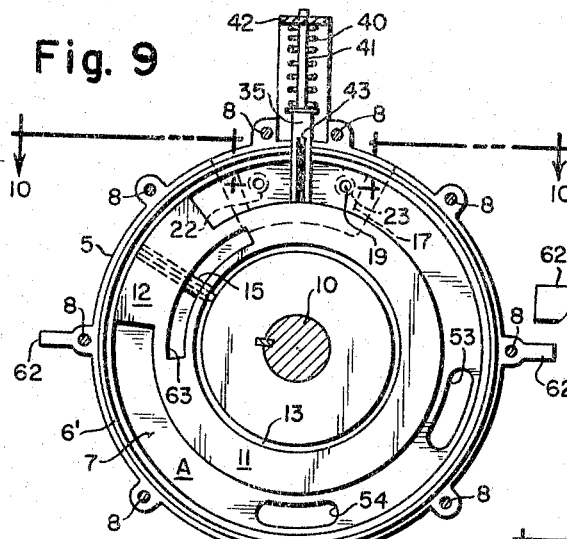

June 6, 1967  J. J. MURIN  3,323,500
ROTARY ENGINE
Filed Aug. 16, 1965  3 Sheets-Sheet 1
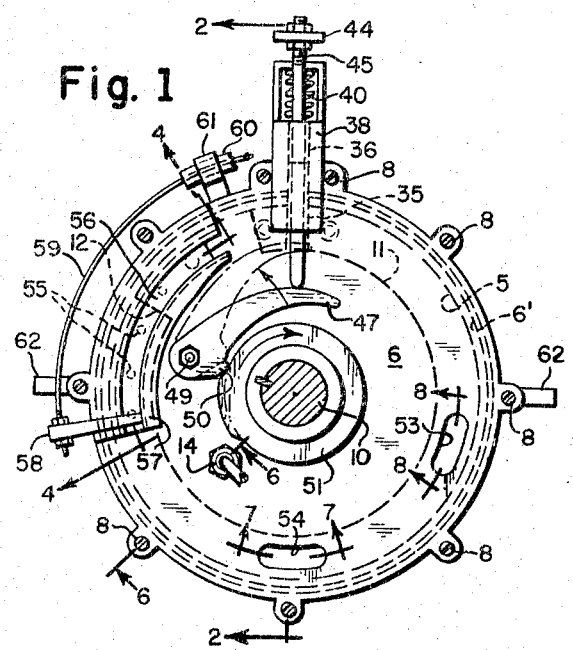
Fig. 1
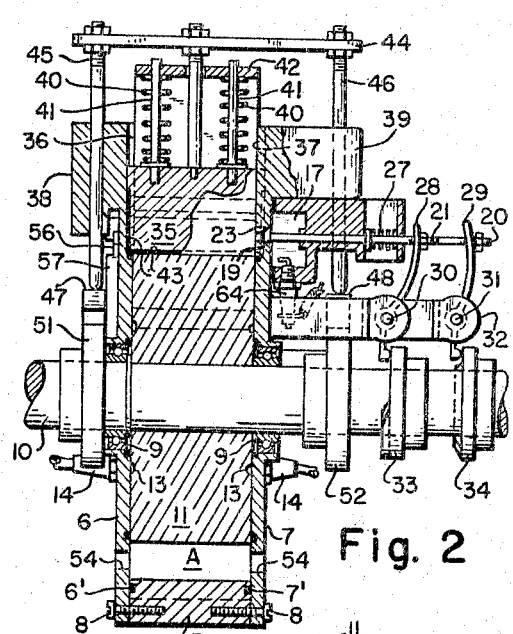
Fig. 2
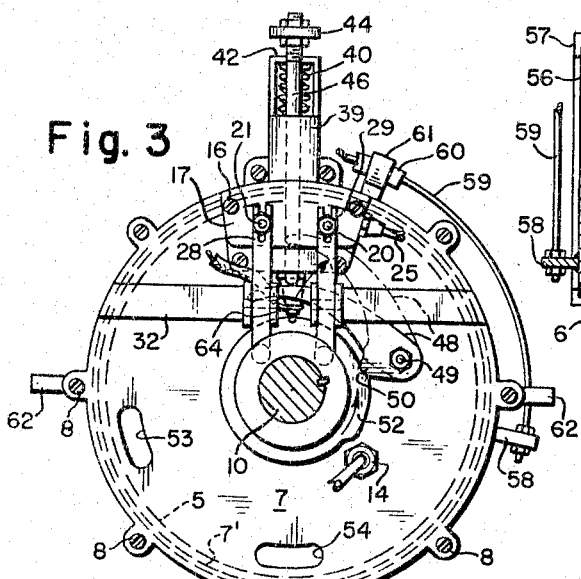
Fig. 3
Fig. 4
Fig. 6
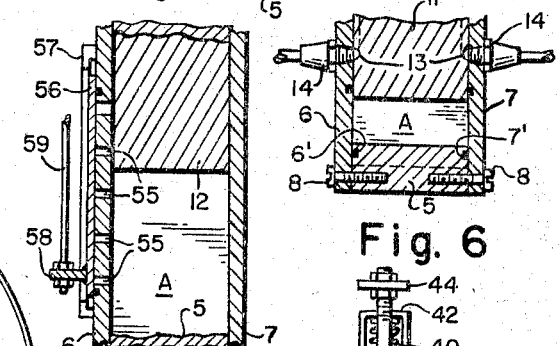
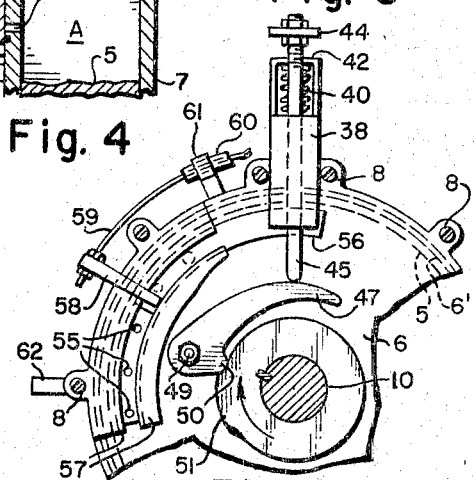
Fig. 5
Fig. 7
Fig. 8
INVENTOR.
JOSEPH J. MURIN
BY
ATTORNEY June 6, 1967  J. J. MURIN  3,323,500

ROTARY ENGINE

Filed Aug. 16, 1965

3 Sheets-Sheet 2

INVENTOR.
JOSEPH J. MURIN
BY
ATTORNEY

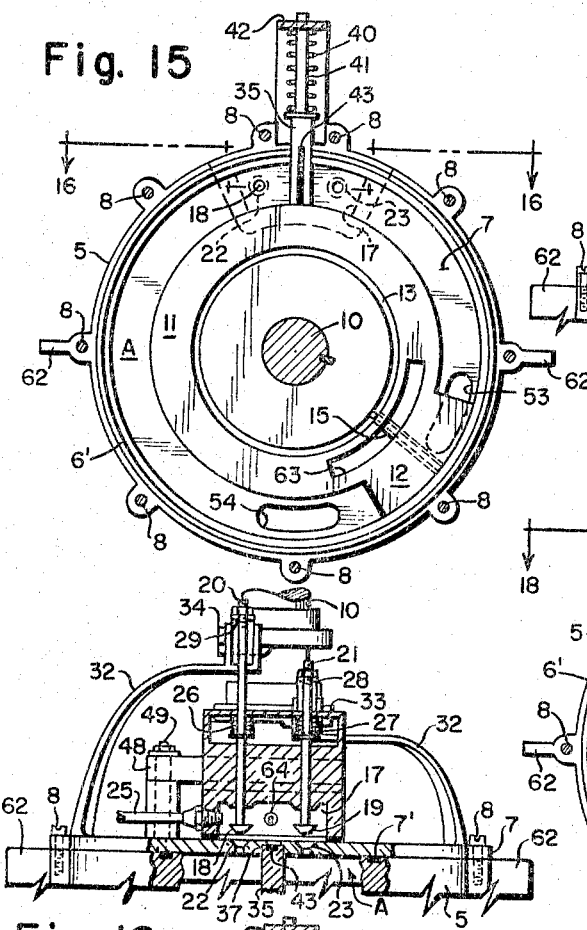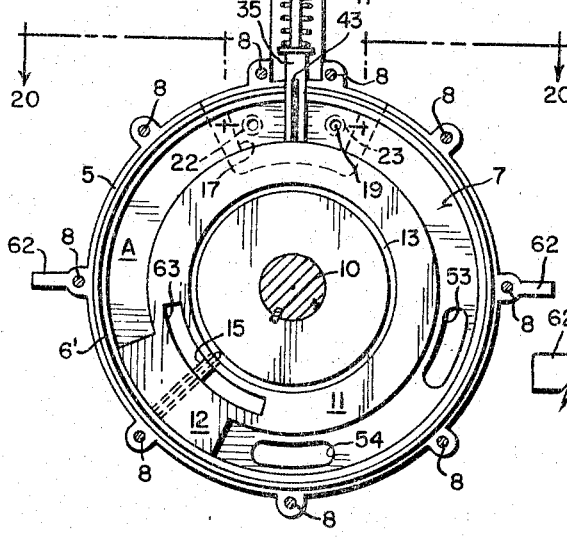

United States Patent Office 3,323,500
Patented June 6, 1967

3,323,500
ROTARY ENGINE
Joseph J. Murin, 1040 SW. 70th Ave.,
Miami, Fla. 33144
Filed Aug. 16, 1965, Ser. No. 479,711
6 Claims. (Cl. 123—14)

This invention relates to a rotary internal combustion engine of the type that has a rotor provided with a single lobe and having a single compression-combustion chamber and with an abutment plate movable across the path of the lobe to form a compression barrier upon one side and a power chamber upon the opposite side whereby the rotor is activated by an explosive mixture.

The invention comprises a cylindrical cylinder having side plates fixed thereto and a drive shaft extending through bearings in the side plates and a radial abutment plate that is shifted to and from spanning relation with respect to the cylinder by cam means carried upon the shaft and a combined compression and combustion chamber having inlet and outlet valves whereby air is compressed into the chamber and with the chamber having an inlet for an explosive charge that is controlled by an injection unit and with the abutment plate being so timed that it will span the cylinder to create compressed air within the chamber and to be exploded to drive the piston and with the valves and the abutment plate being so timed that the abutment plate in one position constitutes a barrier against which air is compressed to enter the compression combustion and then the plate being elevated to permit the passage of the piston and then lowered to form a power chamber between the end of the piston and the plate for driving the piston around the cylinder and to also include vent means and air volume control means for controlling the volume of air to the compression chamber.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

Figure 10:
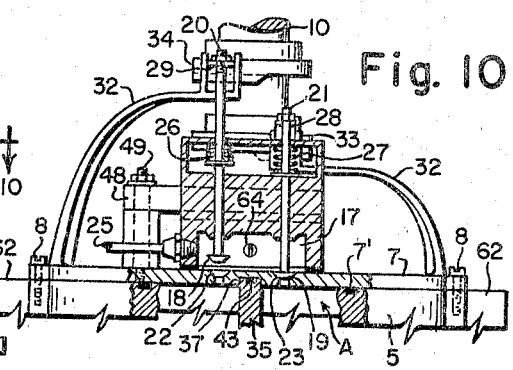
Figure 12:
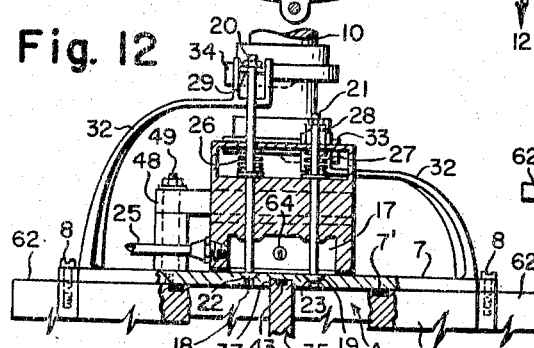
Figure 11:
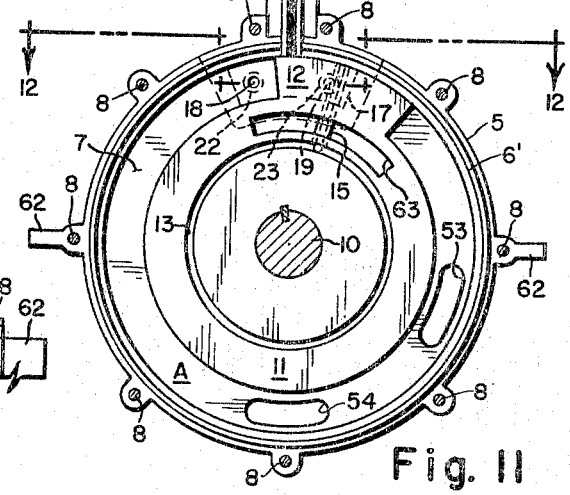
Figure 13:
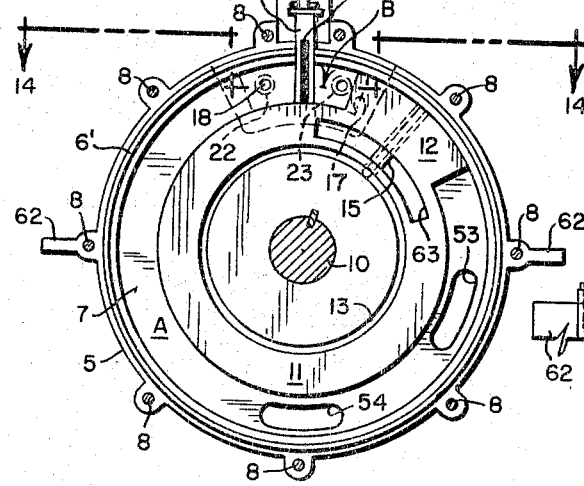
Figure 14:
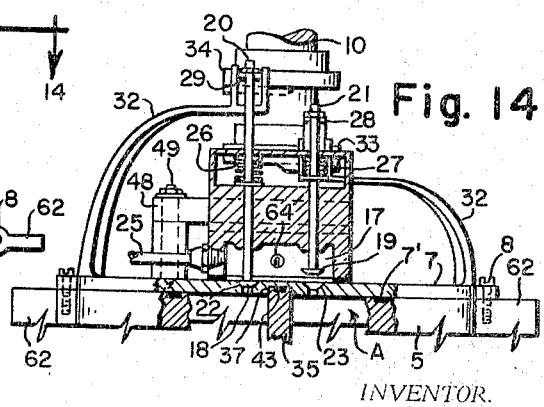

In the drawings:

FIGURE 1 is a side elevation of a rotary engine constructed in accordance with the invention, FIGURE 2 is a central vertical section taken substantially on line 2—2 of FIGURE 1, FIGURE 3 is a side elevation of an opposite side of the engine, FIGURE 4 is a fragmentary sectional view taken substantially on line 4—4 of FIGURE 1, FIGURE 5 is a fragmentary side elevation corresponding to FIGURE 1, FIGURE 6 is a fragmentary sectional view through the engine illustrating oil inlet couplings, FIGURE 7 is a sectional view taken substantially on line 7—7 of FIGURE 1, FIGURE 8 is a sectional view taken substantially on line 8—8 of FIGURE 1, FIGURE 9 is a side elevation similar to FIGURE 1 but with a side plate removed, FIGURE 10 is a section taken substantially on line 10—10 of FIGURE 9, FIGURE 11 is a view similar to FIGURE 9 but showing a different position of the rotor, FIGURE 12 is a section taken on line 12—12 of FIGURE 11, FIGURE 13 is a side elevation similar to FIGURE 1 and illustrating the firing position for the rotor, FIGURE 14 is a section taken on line 14—14 of FIGURE 13, FIGURE 15 is a side elevation similar to FIGURE 9 and illustrating the rotor in an exhaust position, FIGURE 16 is a section taken on line 16—16 of FIGURE 15, FIGURE 17 is a view similar to FIGURE 9 but illustrating the rotor at the start of a compression position, FIGURE 18 is a section taken on line 18—18 of FIGURE 17, FIGURE 19 is a view similar to FIGURE 9 but illustrating the motor in position to begin a compression cycle, and FIGURE 20 is a section taken on line 20—20 of FIGURE 19.

Referring specifically to the drawings, there has been illustrated a cylinder 5 that is open upon opposite sides and closed by cover plates 6 and 7, bolted to the cylinder by bolts 8. Each of the plates 6 and 7 are provided with hub portions carrying anti-friction bearings 9 for the rotatable reception of a shaft 10 and grooves are provided in plates 6 and 7 for seal rings as indicated at 6' and 7'.

Splined upon the shaft 10 and rotatable within the cylinder, is a cylindrical piston 11 that is concentric with a chamber A of the cylinder 5. The piston 11 at one radial point is provided with a lobe 12 and with the lobe 12 also being concentric to the chamber A and with the cylinder and the lobe bearing upon the side walls of the chamber A, formed by the plates 6 and 7 and also the inner wall of the chamber A formed by the cylinder 5. The side walls of the piston 11 are grooved as indicated at 13 for receiving lubricating oil from couplings 14 that are threaded into openings formed in the side plates 6 and 7 and with the grooves 13 communicating with the lobe 12 by a tube 15 that is fitted tightly into an opening formed in the lobe and the piston so as to lubricate the head of the lobe 12 and any other desirable lubricating means may be used as may be found desirable.

Fixed to the plate 7 by bolts 16 and extending outwardly from the plate 7 is a combined compression and firing chamber 17. The chamber 17 is formed hollow and communicates with the chamber A through the medium of valves 18 and 19 carried by valve stems 20 and 21 and with the valves 18 and 19 adapted to seat upon valve seats 22 and 23. The chamber 17 is provided with a fuel injection unit connected to a source of relatively pressurized fuel through a pipe 25. The valves 18 and 19 are normally seated by compression springs 26 and 27 and the valves 18 and 19 are normally unseated by rocker arms 28 and 29, that are pivotally connected at 30 and 31 to a bracket 32 that is fixed to the plate 7. The rocker arms 28 and 29 are movable to unseat the valves 18 and 19 by cams 33 and 34 that are fixed upon the shaft 10 outwardly from the plate 7.

Adapted to alternately span the chamber A and to bear against the piston is a radially movable abutment plate 35 slidable in grooves 36 and 37 of fixed brackets 38 and 39, fixed to the plates 6 and 7 at a predetermined point with respect to the engine and preferably at its top. The grooves 36 and 37 also extend through the marginal portions of the plates 6 and 7 so that the plate 35 may partake of a radial movement up and down and when in the lowermost position, bearing upon the cylinder 11 and when in the uppermost position, being flush with the inner surface of the cylinder 5. The plate 35 is disposed intermediate the spacing of the valves 18 and 19. The plate 35 is biased to a spanning position with respect to the chamber A by compression springs 40, surrounding stems 41 upstanding from the top marginal edge of the plate 35 and with the springs being held in compression relation to the plate by a keeper 42. The plate 35 upon its lower marginal edge and upon its ends being grooved to receive seal strips 43 that bear against the piston 11 and also into the bottoms of the grooves 36 and 37. The plate 35 carries a cross head 44 that extends outwardly from the opposite sides of the engine and carries push rods 45 and 46. The rods 45 and 46 extend through guide openings formed in the brackets 38 and 39 to be engaged by cam arms 47 and 48 and with the arms 47 and 48 being pivoted to the side plates 6 and 7 by pivots 49 and each of the cam arms 47, adjacent to the pivots 49 being provided with lobes 50 that are engaged by cams 51 and 52 upon opposite sides of the engine and with the cams 51 and 52 being identically disposed upon the shaft 10 so that the push rods 45 and 46 may be simultaneously actuated to raise the plate 35. It will of course be understood that the timing for movement of the plate 35 is accurately determined for the rotation of the piston and its lobe 12.

Either one or both plates 6 and 7 are provided with elongated exhaust ports 53 and a scavenging port 54. One side plate 6 is also provided with a plurality of spaced apart air openings 55, covered and uncovered by an arcuate slide plate 56, shiftable in guides 57. The slide plate 56 carries a radial arm 58, that is connected to a cable 59 that is slidable in a tubular cable 60, carried by a bracket 61 and with the cables being extended to a point of operation. The cylinder 5 upon two opposite sides are provided with integral mounting brackets 62, whereby to support the engine in an upright manner. Since the piston 11 is provided with but one radial lobe 12, it follows that the piston must be balanced during its operation and for this purpose, the piston has been cut away at 63. It should be understood, that the piston 11 and the lobe 12 have flat side walls, conforming to the sides of the plates 6 and 7.

In the operation of the device, the piston having been keyed to the shaft 10 and the side plates 6 and 7 fixed upon the opposite sides of the cylinder 5 and the several component elements of the device such as the cams, rocker arms or the like being mounted in position, it necessitates that the shaft 10 be initially rotated either by a mechanical starter or by hand where air is compressed by the lobe 12 in FIGURE 9 and with the plate 35 spanning the chamber A, forms an abutment against which the air is compressed by the lobe 12 and with the inlet valve 18 open and the valve 19 closed, air is compressed into the chamber 17 until such time as the lobe 12 approaches the plate 35, the valve 18 is closed and an explosive charge directed to the chamber 17, creating an explosive charge within the chamber 17 and, just before the lobe 12 contacts the plate 35, the plate 35 is moved outwardly by the cams 51 and 52, to permit the lobe to pass beyond the plate 35 to the position illustrated in FIGURE 11 and, at a predetermined time such as the position illustrated in FIGURE 13 when the lobe 12 passes beyond the area of the plate 35, the plate 35 is biased downwardly by the springs 40, forming a power chamber B between the trailing end of the lobe 12 and the plate 35. The valve 19 opens and simultaneously the charge is ignited by the spark plug 64 causing the explosion to enter the chamber A at the trailing end of the lobe 12 and this explosion forces the piston around the cylinder and as the lobe passes over the exhaust port 53, the greater amount of the explosive charge is exhausted outwardly from the engine. This continued rotation causes the lobe to override the scavenging port 54, causing scavenging air to enter behind the trailing end of the lobe 12. The piston is then in a position approaching a position of compression. The speed of the engine will be governed by the amount of fuel injection, and the volume of air for the correct fuel-air mixture will be controlled by the ports 55 at the leading end of the lobe and the amount of air to be compressed against the plate 35 and into the chamber 17 will depend upon the number of ports 55 that have been opened or closed.

*The operation of the device is as follows*

Starting with the rotor, that includes the piston 11 and the lobe 12, the lobe 12 is in the position illustrated in FIGURE 9. Here, the inlet valve 18 is open and the outlet valve 19 is closed and the abutment plate 35 projected inwardly to contact the piston. The piston 11 moves around the cylinder and when the lobe 12 has reached a predetermined position, where the compression cycle is complete, the inlet valve 18 closes, the plate 35 moves outwardly and the lobe 12 passes by. It is to be noted that both valves 18 and 19 are closed at this point with the compressed charge in the compression and firing chamber 17. The plate 35 being in the raised position to permit the passage of the lobe and at this point, this is the only time in a complete revolution that the plate 35 is retracted. At all other times it is projected inwardly by the springs 40 to bisect the chamber A and to bear upon the piston 11. After the piston has rotated a sufficient distance so that the trailing end of the lobe has gone past the plate 35, the plate is shifted inwardly into contact with the piston and with the lobe being positioned approximately as indicated in FIGURE 13 and, with proper timing fuel is injected into the compression-combustion chamber by the fuel injector 24 where the pressurized charge is ignited by the spark plug 64, while valve 19 is starting to open. The ignition timing and fuel injection will obviously be adjustable, to produce peak engine performance depending on engine speed.

The burning of the explosive charge in the area B will generate pressure, causing the lobe and the piston to rotate and move away from the plate 35 thereby creating rotational force. This cycle will continue until the trailing edge of the lobe passes the exhaust port 53 as shown in FIGURE 15. When this position is reached, the gases will be exhausted through the port 53 to the atmosphere. When the rotor is in the position illustrated in FIGURE 17, the lobe will start the compression vent cycle. In this cycle the outlet valve 19 and inlet valve 18 are both open so the air traveling ahead of the lobe will move through the chamber A, through the chamber 17 and whereby to scavenge the chamber 17. The compression cycle will start when the lobe reaches the position illustrated in FIGURE 19, when the valve 19 closes, causing the air to be compressed into the chamber 17.

The start of the compression cycle will also be determined by the setting of the slide valve 56 and the slide valve shown in FIGURE 1 is in the fully closed position allowing maximum air volume and compression. The lobe 12 after it has moved past vent 54, will compress the air and the compression of the air takes place continuously from the time the lobe passes the vent 54 and with the maximum compression of the air entering the chamber 17 as the lobe approaches the plate 35 and passes through the valve 18 to the chamber 17. This compression cycle would be employed for full power use of the device. For a slower motion of the motor, the slide valve 56 will be progressively shifted to reduce volume and delay start of compression cycle to progressively open the air port 55 and at the maximum openings of the vents 55, the engine will be running in an idling condition.

It will be apparent from the foregoing that the structure as illustrated is the basic idea of this engine, with a single compression combustion chamber and a single rotor having one lobe.

It will be apparent the engine may be provided with multiple rotors, compression-combustion chambers and lobes. Varied combinations of the components may be used, such as one abutment plate serving two rotors, also the locations of the various components may be changed to facilitate design, efficiency and compactness. As in the mechanical variations, the operational cycles can also have many variations, such as several power cycles per revolution or on the other hand, one power cycle for every two revolutions or more. The device is relatively simple in construction and is adaptable to a wide range of uses. The engine may be provided with jackets for water cooling. It is contemplated that the engine shall employ gasoline as a fuel although with slight design modifications can be converted to a diesel or a true diesel with other fuel. Also, the engine can be redesigned to be used as an air compressor using the basic components shown.

It is to be understood that the invention is not limited to the precise construction shown, but that changes are contemplated as readily fall within the spirit of the invention as shall be determined by the scope of the subjoined claims.

I claim:

1. A rotary internal combustion engine of the character described having a cylindrical cylinder that is open upon its opposite sides and with the sides being closed by cover plates, the cover plates each being provided with antifriction bearings for the reception of a cylindrical shaft, the shaft extending outwardly from opposite sides of the engine, the piston being splined to the shaft, a combined compression and combustion chamber fixed to one cover plate centrally with respect to the vertical center line of the engine and with the cover plate being apertured at spaced apart points to form valve seats and with the said chamber communicating with the cylinder at points spaced from a central vertical line of the engine, the said chamber having side walls, valves for each of the apertures and with the valves having stems that traverse openings in a wall of the chamber, spring means for biasing the valves to a closed position with respect to the apertures and a rocker arm for each valve stem that is controlled by cams carried by the shaft and whereby to open the valves against the tension of the springs, one wall of the chamber being provided with a fuel inlet and a wall of the chamber being provided with a spark plug, upstanding guides carried by the cover plates and provided with grooves upon their inner sides to form a guide for an abutment plate, the abutment plate being disposed intermediate the spacing of the valves, spring means for biasing the abutment plate to span the cylinder and to bear against a cylindrical surface of the piston, rods extending through the guides and with the rods being connected by a cross head to the abutment plate and cam means carried upon the shaft outwardly and to shift the abutment plate away from the piston so that its lower edge will be flush with the inner wall of the cylinder and whereby to permit a passage of the lobe in a compression stroke and with the plate being again seated to bear against the piston after the lobe has made its passage and to form a power chamber between the plate and a trailing end of the lobe for driving the piston around the cylinder, the plates being provided with an exhaust passage and an inlet passage and with at least one plate being provided with a plurality of spaced apart openings for the passage of air from the cylinder and a means adapted to progressively cover and uncover the last named openings.

2. The structure according to claim 1 wherein the piston is provided with oil grooves upon its sides and oil inlets carried by each plate whereby oil is conveyed to the cylinder to lubricate the piston and with the oil grooves of the piston communicating with the lobe whereby to oil a cylindrical surface of the lobe.

3. The structure according to claim 1 wherein the abutment plate along its bottom edge and its opposite vertical edges are grooved to receive seal strips that seal the plate against the piston and into the bottoms of the guide grooves.

4. The structure according to claim 1 wherein the compression combustion chamber has seating engagement upon a side wall of one cover plate and with the chamber extending upon opposite sides of the center line of the engine, the valve stems passing through an extension from the chamber for receiving the compression springs that bias the valves to a closed position, the valve stems extending beyond the extension and provided with adjustable stop means that are engaged by the rocker arms, the rocker arms being pivotally connected to a bracket that extends outwardly from one side wall of the engine and with the rocker arms below their pivots being provided with legs that bear against the first named cams whereby to unseat the valves at a predetermined cycle of operation, the lobe when rotated to a position adjacent one valve adapted to compress air through the valve and to the compression combustion chamber with the abutment plate being in spanning relation to the cylinder, the engine being so timed, that the abutment plate after compression rises out of the path of the lobe and permits the lobe to travel to a position away from the second valve and with the plate then being actuated to form a power chamber in the cylinder between the plate and the trailing end of the lobe, the said valves being so timed that a first valve will open during the compression of air into the chamber and with the second valve being seated and when the lobe has passed to an area beyond the plate, the plate is again shifted to a spanning relation with respect to the cylinder and then the explosion occurs in the compression combustion chamber and simultaneously, the second valve is opened to permit the flow of the combustion mixture into the cylinder to drive the piston, the said valves during the initial compression cycle being open so that the lobe will force air through the compression combustion chamber, the said abutment plate being movable to spanning relation with respect to the cylinder.

5. The structure according to claim 1 wherein the rods for actuating the abutment plate are biased upwardly by arcuate arms that are pivoted to a side wall of the engine, the arms having overriding contact with a cam fixed upon the shaft whereby the arms are biased upwardly to raise the abutment plate against the tension of its springs.

6. The structure according to claim 1 wherein the plurality of air openings are in arcuate form in one side plate, guides upon each side of the row of openings and an arcuate cover plate adapted to traverse the guides for covering and uncovering the openings, an arm carried by the slide and a bracket carried by one side plate and a flexible cable extending through the last named bracket for connection with the arm for moving the slide from an operating position.

References Cited
UNITED STATES PATENTS 2,280,742    4/1942    Bowers _____ 123—14

MARK NEWMAN, *Primary Examiner.*

RALPH D. BLAKESLEE, *Examiner.*